United States Patent Office 3,416,888
Patented Dec. 17, 1968

3,416,888
METHOD FOR PREPARING SPHEROIDAL ALUMINA
Bruno Notari, Milan, Italy, assignor to SNAM S.p.A., Milan, Italy, a company of Italy
No Drawing. Filed Mar. 31, 1965, Ser. No. 444,369
Claims priority, application Italy, Apr. 7, 1964, 7,569/64
4 Claims. (Cl. 23—143)

ABSTRACT OF THE DISCLOSURE

A method for producing spheroidal alumina is disclosed wherein a sol of an aluminum salt, such as aluminum chlorohydroxide, is mixed in a water solution of an organic gelling material, such as guar-gum with an ammonium salt of an organic acid, such as ammonium acetate, and the resultant solution is dripped into an oil bath, or other water-immiscible medium, at an elevated temperature, to cause gelling and formation of rigid alumina spherules, which are then treated successively with gaseous ammonia, and aqua ammonia, and then dried and calcined.

---

This invention relates to a method for the preparation of alumina having a spherical or spheroidal shape, which is particularly suitable for use in the petroleum and chemical industries.

As is known, alumina is employed as a catalyst or as a catalyst component or also as a support for catalytically active materials in a number of hydrocarbon conversion processes and as a dehydrating agent.

The employment of alumina having a spherical or spheroidal shape affords a number of advantages, especially when it is employed as an absorbing material, as a purifying agent, as a catalyst or catalyst component or as a support of catalytically active materials for the conversion of organic substances and still more particularly for the conversion of hydrocarbonaceous materials.

When the spheroidally shaped material forms the fixed bed in a reaction or contact area, it spreads about itself in a more uniform way within a reactor as compared with the materials having granule shapes different from the spherical one. This improved evenness minimizes the variation of the pressure drop between the ends of the catalyst bed, consequently reducing also the occurrence of preferential streams within the reactor, thus making practicable a better utilization of the catalytic bed as a whole.

Another paramount advantage of the spherical shape of the particles is the improved wear resistance, since no sharp edges are present, which are liable to break off with a loss of a portion of the catalyst and with the formation of a fine dust susceptible of being entrained by the gaseous stream and of causing the ports and valves of the system to clog.

It is thus apparent that the use of spheroidal particles allows for more efficient utilization of alumina, along with improved reliability and efficiency of the installations.

An object of the present invention is to prepare alumina in a spherical or spheroidal shape by a method which is both simpler and cheaper than those of the contemporary art.

As is known, alumina can exist both in a hydrous and in an anhydrous state and exhibits a number of allotropic states such as alpha alumina, gamma alumina, eta alumina, chi alumina, rho alumina.

In the following, the term "alumina" connotes one or more of the known forms of alumina, both anhydrous and in the form of aluminum hydrates, unless otherwise specified.

According to the prior art, numerous processes for the production of spheroidal alumina resort to the dispersion techniques and more particularly to the dripping of a "sol" of aluminum salts in an immiscible liquid wherein the "sol" is converted into a "gel" maintaining a spherical configuration.

The French Patent 1,042,771 discloses a process in which a "sol" of aluminum salts is admixed with a weak base having a strong buffering action at a pH lying between 4 and 10 and at a hydrolysis speed which is increased as the temperature is increased without evolution of gases and is then caused to pass, in a finely divided form, in a suspension vehicle immiscible with water and maintained therein during progress of gelling. The compounds indicated as weak bases adapted for use are hexamethylenetetramine, condensation products of ammonia with aldehydes other than formaldehyde and ammonium acetate with ammonium hydroxide.

The weak bases cited above are not equivalent to one another and in practice only hexamethylenetetramine and allied compounds are employed.

These bases as employed decompose and evolve gas when heated in dry surroundings and thus, both to the end of not spoiling the product and overcoming reagent losses, very complicated operations in hydrous conditions become imperative. In addition to that, the time taken for the obtention of the end product is very long.

The French Patent No. 1,072,632 and the German Patents Nos. 921,564, 922,530 and 924,718 disclose processes for the production of spherules by gelling, which processes resort to sodium ions or anyhow of alkaline ions in the product. These processes, however, render the latter unsuitable as a catalyst or catalyst component in all those operations in which the catalytic action of alumina is correlated to the acidic properties thereof.

A further object of the present invention is the preparation of alumina in a spherical or spheroidal form, devoid of sodium and alkali metals.

Applicant's process for the preparation of alumina having a spherical or spheroidal shape is already known, in which the employment of ammonia, dispersed or dissolved in the gelling column, is the main feature for the gelling of a solution of an aluminum salt (preferably aluminum chlorohydroxide) and of an ammonium salt of an organic acid having from 1 to 6 carbon atoms (preferably ammonium acetate).

It has now been found that it is possible to cause gelling of the aforesaid solution to occur, without any ammonia being present in the column, via the employment, in the solution, of small amounts of a suitable natural or manmade resin selected among those fulfilling the following requirements: when added to the solution to be gelled in the proportion of 1% by weight, the resultant solution must have a viscosity such that the division of the solution in drops be easily practicable. The solution thus formed must gradually have its viscosity increased up to the possible formation of a stiff gel. Such a viscosity increase with gelling must, however, take place only within a temperature range from 50° C. to 90° C. in order to impede bulk gelling before the dispersion.

Several aluminum salts are suitable for gelling with the process according to the invention, particularly advantageous being an aluminum chlorohydroxide having a ratio of aluminum equivalents to chlorine equivalents ranging from 3 to 7.

In a specific embodiment the present invention relates to a method for producing spheroidal alumina comprising the preparation of a solution containing an aluminum salt, an ammonium salt of an organic acid and a small amount of a resin, the division into drops of said solution within a fluid suspension medium immiscible with water and maintained at a high temperature, within which the gelling of the solution, with formation of rigid spherules, takes place, the collection of the spherules thus obtained in a container where they are immediately treated with gaseous ammonia and washed, and the transfer into a muffle oven for drying and firing at a programmed temperature. The main feature of the present invention consists in the concurrent use of ammonium salts of organic acids and of the resin to encourage the gelling of the aluminum salt containing solution; as a matter of fact neither of these compounds in itself is capable of giving rise to the formation of rigid "gel" spherules from the solution containing the aluminum salt, whereas it is essential, in order that such a transformation may take place, that both the substances be present in the solution.

In order that the best results may be achieved, i.e. satisfactory chemico-physical and mechanical characteristics of the spheroidal alumina after firing, it is necessary to use solutions having well defined concentrations of the several substances, more particularly of the ammonium salt and of the resin. It is obvious, however, that any combination of ammonium salts of organic acids and resin, present optimum values which are a characteristic of the particular substances as used and which can even notably differ from those corresponding to other groups of substances.

It is preferred, on the other hand, both for reasons of economy and in order to facilitate the conversions which take place within the gel spherules, to minimize the amount of resin which is necessary to bring about the gelling.

Many resins are suited to the purpose, both natural and artificial, in amounts ranging from 1% to 7% by weight with respect to the solution to be gelled. Among the natural resins gum arabic, gum tragacanth, gum karaya, guar gum, agar-agar have proved particularly suitable. Among the artificial resins, the methyl ether of cellulose (methoxycellulose), the propyl ether of cellulose and their higher homologs.

Particularly satisfactory results are obtained with the gum extracted from the guar seeds (consisting of a high molecular weight galactomannane) and with methoxycelluloses. As a matter of fact amounts of these resins of less than 1% by weight with respect to the solution to be gelled are satisfactory irrespective of the ammonium salt employed. The amorphous-gel spheres thus obtained are rigid, do not bind to one another and are capable of undergoing all the treatments which are necessary for the transformation into transition alumina. The end product exhibits outstanding chemico-physical and mechanical properties which make them a material which is particularly adapted to being used as a catalyst or as a support for catalytic materials, such as, for example, a specific surface ranging from 250 to 350 sq. meters per gram, a porosity of about 0.8–1.2 cu. cms. per gram and an average pore diameter of about 200 Angstrom units.

The conditions which must be satisfied by the organic acids to be profitably employed in the present process are: a high solubility in water at 0° C., both for the free acids and their ammonium salts, absence of precipitates when they are admixed in the cold with aluminum salts, low cost and ease of recovery.

Monocarboxylic acids having from 1 to 6 carbon atoms, with straight or branched chain configuration, possibly also with hydrophylic substituent radicals such as $-NH_2$, $-OH$, $-Cl$, $-CN$, fulfil the above listed requirements and are suited to the ends of the present invention.

The spherules of gelly materials, just as they are being formed, must be maintained out of contact with air and water. It has been observed, in fact, that the spherules as they are formed, if exposed to the atmosphere, undergo a slow disaggregation with the appearance of a "blooming" which renders them useless to produce spherules having good mechanical properties. Water, then, has an even quicker effect in disaggregating and dissolving the spherules as they are formed.

When the spherules are treated with the above indicated caution, they can be stored even for a long time. It is preferred in general, however, to bring about immediately a treatment with gaseous ammonia which causes the total precipitation of aluminum salts to take place thus rendering the spherules more stable and insensitive to the disaggregating action of air and water.

The thusly treated spherules can be stored indefinitely or they can still undergo a washing with water in order to remove the occluded salts (ammonium acetate and ammonium chloride) and possibly also the resin. The removal of the resin by washing is not necessary in that aluminas prepared with this method undergo a calcination at 500° C.–700° C. for activation purposes and during this operation the organic substances forming the resin are destroyed by burning.

A particularly advantageous feature of the process according to the invention lies in that it permits performing all of the operation without any necessity for bringing alumina into contact with sodium salts and alkali-metal salts in general.

In the alumina prepared according to the present invention, if high purity reagents are employed, the amount of sodium can be less than five parts per million.

The treatment of the spherules with gaseous ammonia and subsequent washing with aqua ammonia at 90° C.– 95° C. produces, with practically quantitative yields, alumina spherules exhibiting outstanding mechanical and chemico-physical properties which make them perfectly suitable for use as catalysts or catalyst mass supports.

By way of example which does not imply any limitations, and in order to make the invention more clearly understood, a few embodiments of the inventive process are reported below.

EXAMPLE 1

An alumina "sol" solution is admixed with an equal volume of a 45% by weight solution of ammonium acetate. The solutions are cooled at 0° C. so that the resultant solution is less viscous. The solution thus obtained is dripped in an oil-bath heated at 90° C. The spheres agglomerate and give a whitish slurry.

EXAMPLE 2

A suspension of guar gum in water is prepared by slurrying 25 grs. in 1.000 cu. cms. water with energetic stirring. To the resultant solution ammonium acetate (820 grs.) is added and, upon completion of the dissolution (with stirring) an equal volume of alumina sol having a sp. gr. of 1.36 grs./cu. cm. is added. During progress of all the operations and especially before adding alumina "sol" the temperature of the solutions should not exceed 5° C. The thusly obtained solution is dripped in an oil-bath heated at 90° C. and the immediate formation of rigid spherules which do not agglomerate and can be readily manipulated for subsequent treatments is observed. The spheroids thus obtained are further treated for a time from 1 to 10 hrs. with gaseous ammonia at 90° C. (under a slight pressure in order to encourage the absorption of ammonia) and then washed with aqua ammonia having a pH between 9 and 11 for a time ranging from 5 to 30 hrs. By so doing, heavily hydrated alumina spherules are obtained and these are placed in a muffle oven at a programmed temperature, kept at 100° C., dried and calcined by feeding a nitrogen stream and by programming the heating speed at 25° C. an hour, up to a temperature of 600° C. On completion of the firing, alumina spherules having very satisfactory mechanical properties are obtained.

The crystalline structure of the product dried at 120° C. was that of the "alpha" monohydrate, while after the calcination the crystalline structure proved to be that of "gamma" alumina.

The specific surface of the calcined alumina has proved to be 350 square meters per gram. This example shows that the addition of 0.6% of guar gum to the mixture of alumina sol and ammonium acetate makes it possible to gel with formation of spheroidal alumina having valuable chemico-physical and mechanical properties by employing the step of dripping a solution of an aluminum salt in a water-immiscible medium.

EXAMPLE 3

A suspension of gum karaya in water is prepared by slurrying 50 grs. of the gum in 1,000 cu. cms. water, with energetic stirring. To the resultant solution, ammonium acetate is added (820 grs.) and, upon completion of the dissolution an equal volume of alumina "sol" (sp. gr. 1.36 grs./cu. cm.) is added.

This solution is dripped and the treatments follow as in the preceding example. Upon calcination at 600° C. alumina spherules, having very favorable mechanical properties, are obtained.

The crystalline structure of the product dried at 120° C. is that of the alpha-monohydrate; after calcination at 600° C. the structure is of gamma-alumina. The specific surface of the calcined alumina proved to be 230 sq. meters/gram.

This example shows that the addition of 1.2% of karaya gum to the admixture of alumina "sol" and ammonium acetate makes it possible to effect the gelling with formation of spheroidal alumina having outstanding chemico-physical and mechanical properties by adopting the step of dripping a solution of an aluminum salt in a water-immiscible medium.

EXAMPLE 4

A suspension of methoxycellulose (methyl ether of cellulose) in water is prepared by slurrying 50 grs. of the product in 1,000 cu. cms. water, with vigorous stirring. By following the suggestions of Example 2, the ammonium and aluminum salts are added and the solution is dripped by performing on the aluminum spherules the treatments with gaseous ammonia, the washing with water and the programmed calcination. Upon completion of the calcination alumina spherules are obtained, which have outstanding mechanical properties, the crystalline structure of "gamma" alumina, and a specific surface as high as 260 sq. meters/gram.

This example shows that the addition of 1.2% of methyl ether of cellulose to the admixture of alumina "sol" and ammonium acetate, makes it possible to effect the gelling with attendant formation of spheroidal alumina having outstanding physico-chemical and mechanical properties, by adopting the step of causing an aluminum salt solution to drip into a water-immiscible medium.

EXAMPLE 5

A continuous process for the preparation of spheroidal alumina is described herein.

A flow of alumina "sol" and a flow of a solution of ammonium acetate containing about 1.3% of guar gum, pre-cooled at −10° C. and metered in the volume ratio 1/1 are admixed in a continuous blender and fed into a dripper. The drops fall in a formation chamber filled with oil and maintained at 90° C. wherein the gelling of the solution is caused to take place.

The thusly formed spheroids are conveyed by a flow of oil towards rotating cylinders fitted with conveying screws, from the bottom of which a stream of gaseous ammonia is sent on. The rotation of the cylinder slowly advances the spherules and the rotational speed is adjusted so that the stay of the spherules may correspond to a treatment with gaseous ammonia identical to the batch-process described in Example 2.

Upon completion of the ammoniating treatment the spherules are sent to two additional identical cylinders through the bottom of which aqua ammonia is fed. Upon completion of the washing, the spherules are discharged on a conveyor belt which forwards them to a continuous oven wherein the programmed calcination takes place. Upon completion of these operations, a spheroidal alumina is obtained, which has very satisfactory mechanical properties and shows, upon analysis, the following physico-chemical properties:

Crystalline structure, "gamma" alumina
Specific surface, sq. m./g._____ 310
Apparent spec. gravity, grs./cu. cm._____ 0.77
Total porosity, cu. cm./gr. _____ 1.0
Average pore diameter, Angstrom units ____ 130

The yield of spherules with respect to the used alumina is virtually quantitative, no production of dust or broken spherules being experienced.

This example shows a continuous process for obtaining spheroidal alumina by dripping a solution of an alumina "sol" and ammonium acetate containing 0.6% of guar gum in a forming chamber containing a water-immiscible medium heated at 90° C. The spheroidal alumina thus obtained is endowed with such properties as to render it suitable as a catalyst or catalyst support.

EXAMPLE 6

Solutions of ammonium salts of the glycolic, chloroacetic, alpha-aminopropionic, chloropropionic and formic acids have been prepared by dissolving 800 grs. of salt in one liter of water containing 25 grs. of dispersed guar gum.

After admixture with the alumina "sol" dripping is caused to occur in an oil-bath maintained at 90° C. and the treatments follow according to Example 2.

Alumina spherules have been obtained which, dried and calcined, have good mechanical properties and high specific surfaces.

This example shows that it is possible to use, at leisure, besides the ammonium acetate, also ammonium salts of monocarboxylic acids having from 1 to 6 carbon atoms, with straight or branched-chain configuration, with hydrophylic substituent radicals such as —$NH_2$, —OH, —Cl, —CN in the technology of formation of spheroidal alumina by dripping in a water-immiscible medium.

The embodiments of the invention in which an exclusive property or privilege is claimed are defined as follows:

1. A process for preparing spheroidal alumina which comprises mixing an alumina sol and an ammonium salt of an organic acid containing from 1 to 6 carbon atoms in a solution containing a gelling material selected from the group consisting of gum arabic, gum karaya, gum tragacanth, guar-gum, agar-agar, methoxy-cellulose, and the propyl ether of cellulose, and dispersing the solution in an oil bath maintained at a temperature between 50° C. and 90° C. to cause gelling and formation of rigid hydrated alumina spherules.

2. A process according to claim 1, wherein the aluminum sol is aluminum chlorohydroxide.

3. A process according to claim 1, wherein the organic acids contain substituent radicals selected from the group of radicals consisting of —$NH_2$, —OH, Cl, and —CN.

4. A process according to claim 1, wherein the alumina spherules obtained are treated with gaseous ammonia for from 1 to 10 hours, then subjected to washing with aqua ammonia for from 5 to 30 hours, and then dried and calcined.

References Cited

UNITED STATES PATENTS

| | | | |
|---|---|---|---|
| 2,417,664 | 3/1947 | Schmitt | 252—448 |
| 2,666,749 | 1/1954 | Hoekstra | 252—448 |
| 2,697,066 | 12/1954 | Sieg. | |
| 2,865,866 | 12/1958 | Hoekstra | 252—448 |
| 2,968,635 | 1/1961 | Nixon | 23—143 X |
| 3,033,800 | 5/1962 | Elliott et al. | 252—466 X |
| 3,038,784 | 6/1962 | Torkar et al. | 23—143 |
| 3,152,865 | 1/1964 | Koch | 23—143 |

OTHER REFERENCES

Newsome et al., "Alumina Properties," Aluminum Company of America, Pittsburgh, Pa. (1960), pp. 49 and 50. TA 480 A6 A 52.

Merck Index, 7th ed., 1960, pp. 502, 587 and 588. RS 356 M524.

OSCAR R. VERTIZ, *Primary Examiner.*

G. T. OZAKI, *Assistant Examiner.*

U.S. Cl. X.R.

252—448, 463